Oct. 6, 1970 D. W. BRAMER 3,532,961
STROBE FLASH SYSTEM POWER CONVERTER
Filed Jan. 6, 1969
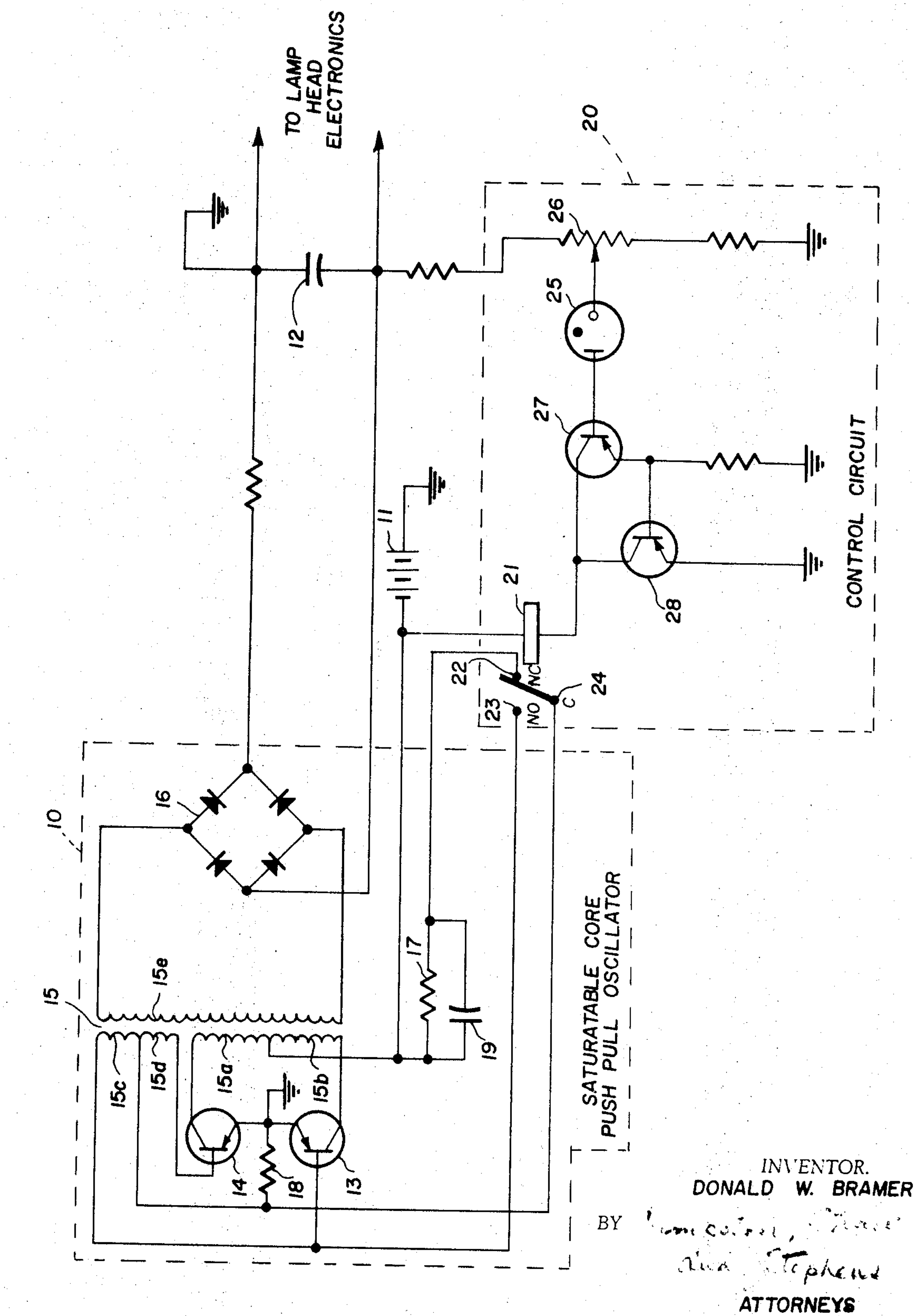
INVENTOR.
DONALD W. BRAMER
BY [signature]
ATTORNEYS United States Patent Office 3,532,961

Patented Oct. 6, 1970

3,532,961

STROBE FLASH SYSTEM POWER CONVERTER

Donald W. Bramer, Fairport, N.Y., assignor to Grafles, Inc., Pittsford, N.Y., a corporation of New York Filed Jan. 6, 1969, Ser. No. 789,249
Int. Cl. H02m 7/00
U.S. Cl. 321—18 10 Claims

ABSTRACT OF THE DISCLOSURE

A strobe flash system uses a low voltage battery and an efficient, push-pull, saturatable core, transistor oscillator to charge a storage capacitor to a higher voltage, and the oscillations are squelched when the desired charge on the capacitor is reached by circuitry that detects the capacitor voltage and actuates a relay to switch off the forward bias for the oscillator transistors and also to short out a feedback winding of the transformer.

Strobe flash lamps are generally powered by a relatively high voltage storage capacitor that discharges through the strobe lamp, and the capacitor is charged by either a high-voltage, multi-cell battery or by a lower voltage battery with a power converter and control circuit to regulate the charge. The latter has many advantages and this invention improves on the converter and control circuitry for a more efficient and economical strobe flash system.

First, the invention recognizes the need for using the most efficient oscillator for the power converter—a push-pull, saturatable core, transistor oscillator with a substantially square wave output that converts to an efficient charging current for the storage capacitor. Previously, such oscillators have not been used efficiently in combination with squelching circuits for strobe flash systems because of the difficulty of completely squelching or cutting off the oscillation when the desired charge on the storage capacitor is reached. The oscillations in push-pull, saturatable core oscillators tend to continue even with very low impedance squelching circuits applied in the feedback circuit, so that secure squelching of such an oscillator required switching off the main battery power to the oscillator. This was unsatisfactory because the high currents involved would erode the switch contacts and would require heavy duty relays that are too large and expensive. The previous compromise was to use less efficient oscillators that otherwise were easier to squelch, or squelch circuitry which lessened efficiency of more efficient converter oscillator systems.

The invention affords complete oscillator squelching in a simple and economical circuit that allows the efficient push-pull, saturatable core, oscillator to be used effectively. The invention provides fast and efficient capacitor charging in a compact, lightweight and inexpensive circuit that regulates the flash tube voltage to within one-half *f*-stop or less for accurate exposure control.

SUMMARY OF THE INVENTION

The inventive flash system uses a battery, a push-pull-saturatable core, transistor oscillator powered by the battery for charging a storage capacitor to a higher voltage, means for detecting the voltage on the storage capacitor, and a switch means arranged for actuation in response to the storage capacitor reaching a pre-determined voltage. The switch means is arranged so that its actuation accomplishes two changes in the oscillator circuitry that ensures rapid squelching of the oscillations. These changes are removal of the forward bias from the oscillator transistors and shorting out of a winding of the transformer. Preferably, a relay having a common, a normally closed, and a normally open contact accomplishes the changes by having the forward bias supplied through the common and the normally closed contact and the transformer shorting circuit completed through the normally open contact. Actuation of the relay in response to the voltage detector moves the common from the normally closed to the normally open contact. The shorted transformer winding is preferably a feedback winding to one of the transistors, and the shorting of such winding reduces the inductance and core permeability of the transformer to alter its impedance coupling to deprive the oscillator transistors of usable feedback. This, together with removal of the forward bias, ensures a rapid cutoff of the oscillator and allows its use in a power-regulated strobe flash system.

THE DRAWINGS

A schematic circuit diagram of one preferred embodiment of the inventive strobe flash system is shown in the drawing.

DETAILED DESCRIPTION

Battery 11 powers push-pull, saturatable core, transistor oscillator 10 arranged at the left of the circuit diagram for charging storage capacitor 12 which delivers its charge to the lamp head circuitry for producing a flash. The lamp head electronics are generally known and are not illustrated in the drawing.

The push-pull, saturatable core oscillator 10 includes two oscillating transistors 13 and 14 arranged in a grounded emitter configuration, a transformer 15, and a rectifier 16. Transformer 15 has input windings **15*a* and 15*b* energized by oscillation of transistors 13 and 14, feedback windings 15*c* and 15*d* applying induced feedback signals to the bases of transistors 13 and 14, and an output winding 15*e* connected to rectifier 16 for supplying voltage to capacitor 12**.

Forward bias to the transistors 13 and 14 is provided by resistors 17 and 18 and capacitor 19 connected through relay 21 of control circuit 20 at the lower right of the diagram. Relay 21 includes normally closed contact 22, normally open contact 23, and common contact 24, and the forward bias connection of resistors 17 and 18 is through the normally closed and common contacts of relay 21.

Control circuit 20 also includes neon trigger lamp 25 and control resistor 26 for detecting a predetermined voltage on storage capacitor 12. Neon trigger lamp 25 is arranged in an amplifier circuit including transistors 27 and 28 for actuating relay 21.

When the inventive system is turned on to charge capacitor 12 in readiness for a flash, the common contact 24 of relay 21 is normally closed against contact 22 to provide forward bias to oscillator transistors 13 and 14, and oscillation commences under the power of battery 11.

The oscillations are applied to coils **15*a* and 15*b* of transformer 15 for producing an output in transformer coil 15*e* and induced regenerative feedback in transformer coils 15*c* and 15*d*. The approximately square wave output of transformer coil 15*e* is converted to DC by rectifier 16 and applied to storage capacitor 12**.

These conditions continue for typically four to six seconds until the charge on capacitor 12 reaches a predetermined firing value for the flash lamp. Such charge is detected by neon trigger lamp 25 which is triggered into conduction through amplifying transistors 27 and 28 to actuate relay 21. This switches common contact 24 from normally closed contact 22 to normally open contact 23. The result is two changes in the oscillator circuitry—removal of the forward bias of resistors 17 and 18 through contact 22, and placing a short across transformer feed-back winding **15*c* through contact 23. The shorting of winding 15*c* reduces the inductance core permeability of transformer 15 to reduce the impedance coupling of coil 15*c*** to near zero, depriving transistor 13 of feedback. This, together with removal of the forward bias, effectively squelches oscillations quickly to prevent further charging of capacitor 12.

The common contact 24 of relay 21 remains in engagement with normally open contact 23 so long as the desired charge is maintained on capacitor 12. When the charge on storage capacitor 12 is discharged by a flash or leaks down to typically 85% to 95% of its full value, neon trigger lamp 25 extinguishes causing relay contact 24 to move back into engagement with normally closed contact 22. This restores the forward bias of resistor 17 and 18 and removes the short from transformer winding 15*c* so that oscillations again commence until full charging of capacitor 12 makes neon trigger lamp 25 conducting for actuating relay 21 as previously described. Through the inventive arrangement, the voltage of storage capacitor 12 is regulated to within one-half *f*-stop or less for accurate illumination with each exposure flash.

Persons wishing to practice the invention should remember that other embodiments and variations can be adapted to particular circumstances. Even though one point of view is necessarily chosen in describing and claiming the invention, this should not inhibit broader or related applications within the spirit of the invention. For example, both feedback windings of the transformer or another winding of the transformer can be shorted out to squelch the oscillation, oscillators with a grounded base configuration can be used, different relay contact arrangements can be used, other switching devices can be substituted for the relay, the voltage detection circuit can be modified, other rectifiers can be used, forward bias can be different, and the system can be adapted for a variety of lamp head circuits.

I claim:

1. A strobe flash system having a battery and a storage capacitor charged to a voltage higher than said battery, said system including a power converter comprising:

(a) a push-pull, saturatable core, transistor oscillator powered by said battery and including a transformer and a rectifier for charging said storage capacitor;

(b) means arranged for detecting the voltage of said storage capacitor;

(c) switch means in circuit with said voltage detecting means and arranged for actuation in response to said storage capacitor reaching a predetermined voltage.

(d) said switch means being arranged in circuit with said oscillator for removing the forward bias from said oscillator transistors upon said actuation; and (e) said switch means being arranged in circuit with said oscillator for shorting out a winding of said transformer upon said actuation.

2. The system of claim 1 wherein said forward bais is supplied through a normally closed condition of said switch means, said normally closed condition being altered by said actuation.

3. The system of claim 1 wherein said switch means comprises a relay.

4. The system of claim 3 wherein said relay includes a common contact, a normally closed contact, and a normally open contact.

5. The system of claim 4 wherein said forward bias is supplied through said common contact and said normally closed contact of said relay, and said actuation opens the circuit through said normally closed contact.

6. The system of claim 5 wherein said voltage detecting means comprises a neon lamp and a control resistor.

7. The system of claim 5 wherein said actuation of said relay provides said shorting of said transformer winding through said common contact and said normally open contact.

8. The system of claim 7 wherein said shorted winding of said transformer is a feedback winding for one of the transistors of said oscillator.

9. The system of claim 1 wherein said voltage detecting means comprises a neon lamp and a control resistor arranged in an amplifier circuit for said actuation of said switch means.

10. The system of claim 1 wherein said sorted winding of said transformer is a feedback winding for one of the transistors of said oscillator.

References Cited

UNITED STATES PATENTS

| | | | |
|---|---|---|---|
| 2,935,650 | 5/1960 | Rock. | |
| 2,946,924 | 7/1960 | Gerlach. | |
| 2,977,524 | 3/1961 | Lingle | 320—1 |
| 3,162,786 | 12/1964 | Kapteyn. | |
| 3,229,158 | 1/1966 | Jensen. | |
| 3,248,605 | 4/1966 | Tomkinson. | |
| 3,274,478 | 9/1966 | Hollman et al. | 321—18 |
| 3,310,723 | 3/1967 | Schmidt et al. | 320—1 |

WILLIAM M. SHOOP, Jr., Primary Examiner

U.S. Cl. X.R.

315—241; 320—1; 307—130